(No Model.)

C. A. CURTIS.
THILL COUPLING BOLT.

No. 270,935. Patented Jan. 23, 1883.

WITNESSES
C. H. Dorer
H. Engel

INVENTOR
Charles A. Curtis
By Leggett & Leggett
ATTORNEYS

N. PETERS. Photo-Lithographer, Washington, D. C.

UNITED STATES PATENT OFFICE.

CHARLES A. CURTIS, OF KIRTLAND, OHIO.

THILL-COUPLING BOLT.

SPECIFICATION forming part of Letters Patent No. 270,935, dated January 23, 1883.

Application filed July 24, 1882. (No model.)

*To all whom it may concern:*

Be it known that I, CHARLES A. CURTIS, of Kirtland, in the county of Lake and State of Ohio, have invented certain new and useful Improvements in Bolts; and I do hereby declare the following to be a full, clear, and exact description of the invention, such as will enable others skilled in the art to which it pertains to make and use the same.

My invention relates to bolts for use in thill-couplers, spring-couplers, and like devices where the wear upon a bolt is such as to cause it in time to become loose and rattle; and it consists in parts and combination of parts, as are hereinafter more fully set forth and claimed.

Figure 1:
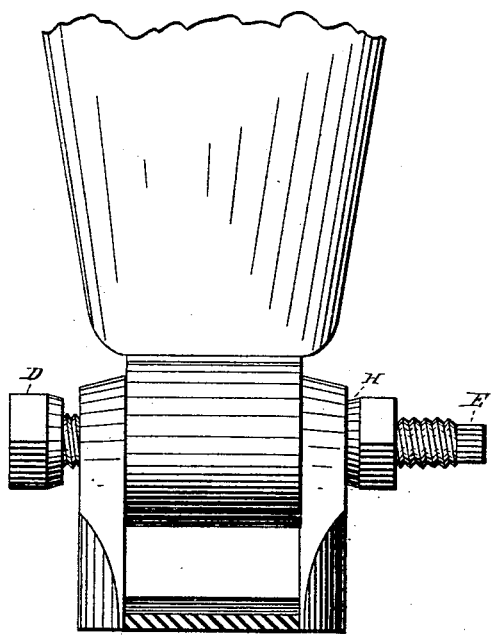
Figure 2:
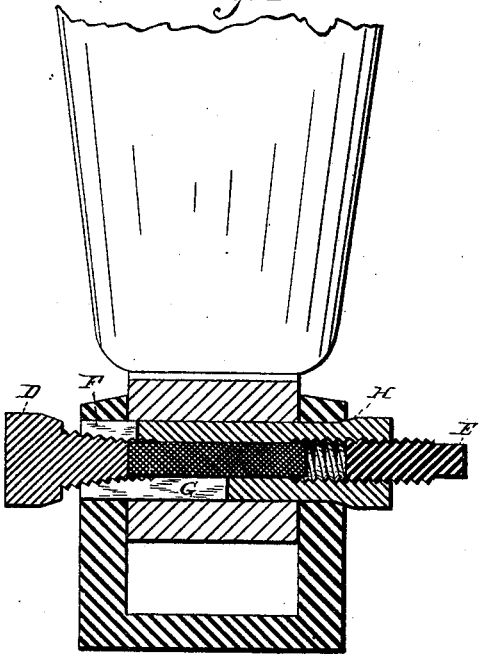
Figure 3:
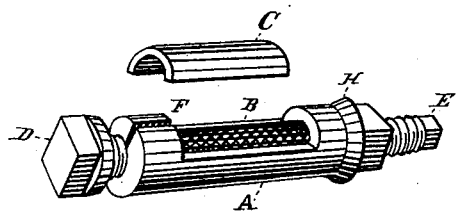
Figure 4:
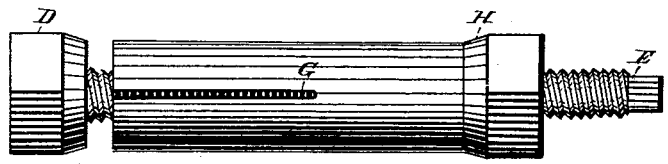

In the drawings, Figure 1 is a plan view of a thill-coupling provided with a bolt embodying my invention. Fig. 2 is a transverse section of the same. Fig. 3 is a view of the bolt detached, showing the separate parts of the same. Fig. 4 is a plan view of my improved bolt with its parts assembled.

A is the bolt, cylindrical in form and made hollow through its center, as shown. In this bolt, as shown in Fig. 3, I provide a recess, into which I place an elastic filling, B, preferably of rubber, to take up the wear of the section of the bolt C, detached and bearing against it.

C is the detached section cut from the hollow bolt, which is pressed against the journal by the filling B.

D is a set tapering screw, adapted to expand the slotted end of the hollow bolt A and bind it in the bearing, thus preventing the bolt from rattling.

E is an ordinary screw-bolt to press against the elastic filling B, and said elastic filling acting to force it (the detached section C) outward and take up any wear that may result from friction between a bolt and its journal.

F and G in Figs. 3 and 4 represent the two slots cut in the hollow bolt A to allow it to expand when the tapering screw D is turned to pass into the hollow bolt A. The journal or hole in which it is desired to place the bolt should be just large enough to allow the bolt to fit snugly within it. When it is desired to introduce said bolt into its journal, remove the set tapering screw D from the upper portion of the bolt and insert the bolt from beneath the parts to be coupled. The bolt is so constructed that the lower part is enlarged to form a head, H, and the tapering screw D inserted at the top of the bolt acts as a nut on the bottom of an ordinary bolt. It will be seen that the wear and friction come on the section C of the bolt and the journal, and that as said section C or the journal is worn away the elastic filling B forces the section C outward and takes up said wear, and, by keeping the parts or bearings snugly together, thereby obviates any rattling that would otherwise occur. By this construction, whenever the hollow bolt A becomes loose from wear in the socket, it can easily be tightened by turning the screw E, which will cause the elastic core B to expand and press against the section C, thus causing a closer fit in the journal-bearings.

I do not limit myself to thill-couplings in the use of this improved bolt, but claim for it the use in any couplings where it is necessary to provide against the wear and rattle incident to couplings in general.

What I claim is—

1. The combination, with a hollow bolt and a detachable section of the same, of a solid elastic core located in the cavity of the bolt, and a set-screw entering the cavity of the bolt from one end thereof and arranged to compress the core, and thereby elevate the detachable section of the bolt, substantially as set forth.

2. The combination, with a hollow bolt having a cutaway portion to receive a detachable section, and provided with slots which respectively lead into and extend under said cutaway portion, of a tapering set-screw located in the slotted end of the bolt and arranged to expand it, substantially as set forth.

In testimony whereof I have signed my name to this specification in the presence of two subscribing witnesses.

CHARLES A. CURTIS.

Witnesses:
JNO. CROWELL, Jr.,
ALBERT E. LYNCH.